United States Patent
Zhang et al.

(10) Patent No.: US 10,124,885 B2
(45) Date of Patent: Nov. 13, 2018

(54) UNDERCARRIAGE FOR AIRCRAFT, AIRCRAFT AND AIRCRAFT LANDING METHOD

(71) Applicant: BOE TECHNOLOGY GROUP CO., LTD., Beijing (CN)

(72) Inventors: Yifei Zhang, Beijing (CN); Ying Zhang, Beijing (CN); Yu Gu, Beijing (CN); Kai Zhao, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/526,985

(22) PCT Filed: May 11, 2016

(86) PCT No.: PCT/CN2016/081643
§ 371 (c)(1),
(2) Date: May 15, 2017

(87) PCT Pub. No.: WO2017/166382
PCT Pub. Date: Oct. 5, 2017

(65) Prior Publication Data
US 2018/0194459 A1    Jul. 12, 2018

(30) Foreign Application Priority Data
Mar. 29, 2016    (CN) .......................... 2016 1 0187582

(51) Int. Cl.
*B64C 25/32*    (2006.01)
*B64C 25/26*    (2006.01)
(Continued)

(52) U.S. Cl.
CPC .............. *B64C 25/26* (2013.01); *B64C 25/22* (2013.01); *B64C 25/24* (2013.01); *B64C 25/34* (2013.01);
(Continued)

(58) Field of Classification Search
CPC ...... B64C 25/26; B64C 2025/325; B64G 1/62
See application file for complete search history.

(56) References Cited

U.S. PATENT DOCUMENTS

| 5,299,761 A | 4/1994 | Robin et al. | |
|---|---|---|---|
| 6,922,610 B2* | 7/2005 | Okamoto | B25J 9/06 219/121.74 |
| 2018/0141644 A1* | 5/2018 | Waltner | B64C 25/22 |

FOREIGN PATENT DOCUMENTS

| CN | 102431644 A | 5/2012 |
|---|---|---|
| CN | 102639397 A | 8/2012 |

(Continued)

OTHER PUBLICATIONS

English translation of International Search Report and Written Opinion dated Dec. 9, 2016, for corresponding PCT Application No. PCT/CN2016/081643.
(Continued)

*Primary Examiner* — Brian M O'Hara
(74) *Attorney, Agent, or Firm* — Kinney & Lange, P.A.

(57) ABSTRACT

An undercarriage for an aircraft, an aircraft and an aircraft landing method are disclosed. The undercarriage includes: at least three bendable mechanical arms, wherein each mechanical arm includes a mount, a first link and a second link located in a same plane, the mount is connected with the aircraft, the mount is rotatable about an axis perpendicular to a bottom surface of the aircraft, the other end of the first link is pivotably connected with one end of the second link, and the other end of the second link is connected with a rotating wheel; a force feedback device configured to detect
(Continued)

whether or not the mechanical arms receive forces, respectively; and drive mechanisms configured to respectively drive the mechanical arms to move such that in an out-spreading process of the undercarriage, the drive mechanisms drive any one of the mechanism arms to be maintained in a current state when the force feedback device detects that the one of the mechanism arms receives a force.

20 Claims, 5 Drawing Sheets

(51) Int. Cl.
*B64C 25/22* (2006.01)
*B64C 25/24* (2006.01)
*B64C 25/40* (2006.01)
*B64C 25/34* (2006.01)
*B64C 39/02* (2006.01)

(52) U.S. Cl.
CPC .......... *B64C 25/405* (2013.01); *B64C 39/024* (2013.01); *B64C 2025/325* (2013.01)

(56) References Cited

FOREIGN PATENT DOCUMENTS

| | | |
|---|---|---|
| CN | 103523212 A | 1/2014 |
| CN | 104619591 A | 5/2015 |
| CN | 204606203 U | 9/2015 |
| CN | 105173066 A | 12/2015 |
| CN | 204916166 U | 12/2015 |
| CN | 205098463 U | 3/2016 |
| EP | 2526017 A1 | 11/2012 |
| EP | 2925605 A1 | 10/2015 |
| EP | 2987724 A1 | 2/2016 |

OTHER PUBLICATIONS

First Chinese Office Action, for Chinese Patent Application No. 201610187582.8, dated May 24, 2017, 20 pages.

\* cited by examiner

UNDERCARRIAGE FOR AIRCRAFT, AIRCRAFT AND AIRCRAFT LANDING METHOD

CROSS-REFERENCE TO RELATED APPLICATIONS

This application is a Section 371 National Stage Application of International Application No. PCT/CN2016/081643, filed on 11 May 2016, entitled "UNDERCARRIAGE FOR AIRCRAFT, AIRCRAFT AND AIRCRAFT LANDING METHOD", which has not yet published, which claims priority to Chinese Application No. 201610187582.8, filed on 29 Mar. 2016, incorporated herein by reference in their entirety.

BACKGROUND

Technical Field

The embodiments of the present invention relates to a field of undercarriage technology for an aircraft, and particularly to an undercarriage for an aircraft, an aircraft and an aircraft landing method.

Description of the Related Art

An undercarriage of an existing helicopter is mainly in form of two types, i.e. a wheeled type and a bogie type. Each type of undercarriage comes into contact with ground surface through supporting arms, supporting wheels and the like, thereby supporting the helicopter.

However, for either type of undercarriages, it is required that a landing ground surface should be even. If the ground surface is uneven, it is necessary that some of the supporting arms and the supporting wheels cannot come into contact with the ground surface, so that the support is unstable.

SUMMARY

In accordance with an aspect of the present invention, there is provided an undercarriage for an aircraft, the undercarriage comprising:

at least three bendable mechanical arms, wherein, each mechanical arm comprises a mount, a first link and a second link located in a same plane, one end of the mount is connected with the aircraft, the other end of the mount is pivotably connected with one end of the first link, the mount is rotatable about an axis perpendicular to a bottom surface of the aircraft, the other end of the first link is pivotably connected with one end of the second link, and the other end of the second link is connected with a rotating wheel;

a force feedback device configured to detect whether or not the mechanical arms receive forces, respectively; and drive mechanisms configured to respectively drive the mechanical arms to move such that, in an outspreading process of the undercarriage, the drive mechanisms drive any one of the mechanism arms to be maintained in a current state when the force feedback device detects that one of the mechanism arms receives a force.

When the undercarriage is an undercarriage for a manned aircraft, a diameter of the rotating wheel may be in a range of 170-300 mm; and when the undercarriage is an undercarriage for an unmanned aircraft, the diameter of the rotating wheel may be in a range of 5-70 mm.

The rotating wheel may be a Mecanum wheel; and the undercarriage further comprises a rotating wheel driving mechanism configured to drive the Mecanum wheel to rotate.

The Mecanum wheel may comprise a body and a plurality of rollers disposed at the body and made of polyurethane.

The rotating wheel driving mechanism may be a hub-mounted motor disposed in a hub of the Mecanum wheel.

The number of the mechanical arms may be three, and connection points where the three mechanical arms are connected with the aircraft are three vertexes of an equilateral triangle.

The number of the mechanical arms may be four, and connection points where the four mechanical arms are connected with the aircraft are four vertexes of a rectangle or an isosceles trapezoid.

A proportion of lengths of the mount, the first link, and the second link may be 0.8-1.2:2.6-3.4:1.7-2.3.

A proportion of lengths of the mount, the first link, and the second link may be 1:3:2.

When the undercarriage is an undercarriage for a manned aircraft, a total length of the mount, the first link, and the second link may be in a range of 1.5-2 m; and when the undercarriage is an undercarriage for an unmanned aircraft, the total length of the mount, the first link, and the second link may be in a range of 0.12-0.3 m.

The mount may be rotatable 360 degrees about the axis perpendicular to the bottom surface of the aircraft;

an angle between the mount and the first link is variable in a range of 0-180 degrees; and an angle between the first link and the second link is variable in a range of 0-180 degrees.

The drive mechanisms configured to drive the mounts and the first links to rotate relative to one another and configured to drive the first links and the second links to rotate relative to one another may be hydraulic drive mechanisms; and the drive mechanisms configured to drive the mounts to rotate about the axes perpendicular to the bottom surface of the aircraft may be electric drive mechanisms.

The undercarriage for an aircraft may further comprise an image acquisition unit disposed at the bottom surface of the aircraft, wherein, in the outspreading process of the undercarriage, the image acquisition unit acquires an image under the aircraft, so that the drive mechanisms drive the mounts to rotate about the axes perpendicular to the bottom surface of the aircraft according to the image.

When the undercarriage is in an outspread state, if the force feedback device detects that any one of the mechanism arms receives no force, the drive mechanisms drive the one of the mechanism arms to continue to spread until the force feedback device detects that the one of the mechanism arms receives a force, and then drive the one of the mechanism arms to be maintained in a current state.

In accordance with another aspect of the present invention, there is provided an aircraft comprising the above-mentioned undercarriage.

The aircraft may be a vertical landing aircraft.

The vertical landing aircraft may be a helicopter or a propeller-driven unmanned aircraft.

The aircraft may further comprise:

a turnover plate having a connection surface, the turnover plate is capable of turning over in a range of a position where the connection surface faces towards a ground surface and a position where the connection surface faces away from the ground surface, and the mounts of the mechanical arms are connected to the connection surface of the turnover plate.

In accordance with a further aspect of the present invention, there is provided an aircraft landing method. The aircraft is the abovementioned one. The aircraft landing method comprises:

driving, by the drive mechanisms, the mounts to rotate to required positions relative to the bottom surface of the aircraft;

driving, by the drive mechanisms, the mounts and the first links of the mechanical arms to rotate relative to one another, and driving, by the drive mechanisms, the first links and the second links to rotate relative to one another, so that the mechanical arms are gradually spread; and driving, by the drive mechanisms, any one of the mechanism arms to be maintained in a current state when the force feedback device detects that the one of the mechanism arms receives a resistance force.

A speed of a relative rotation between the mount and the first link and a speed of a relative rotation between the first link and the second link may be 1-5 deg/s.

DETAILED DESCRIPTION OF THE EMBODIMENTS

In order that technical solutions of the present invention are more readily appreciated by those skilled in the art, a further detailed description of the present invention will be made as below with reference to embodiments of the present invention taken in conjunction with the accompanying drawings.

In accordance with an aspect of the present invention, there is provided an undercarriage.

As shown in FIG. 1 to FIG. 8, the undercarriage comprises:

at least three bendable mechanical arms 1, wherein, each mechanical arm 1 comprises a mount 11, a first link 12, and a second link 13 located in a same plane, one end of the mount 11 is connected with the aircraft 9, the other end of the mount is pivotably connected with one end of the first link 12, the mount 11 is rotatable about an axis perpendicular to a bottom surface of the aircraft 9, the other end of the first link 12 is pivotably connected with one end of the second link 13, and the other end of the second link 13 is connected with a rotating wheel;

a force feedback device configured to detect whether or not the mechanical arms 1 receive forces, respectively; and drive mechanisms configured to respectively drive the mechanical arms 1 to move such that, in an outspreading process of the undercarriage, the drive mechanisms drive any one of the mechanism arms 1 to be maintained in a current state when the force feedback device detects that the one of the mechanism arms 1 receives a force.

Figure 1:
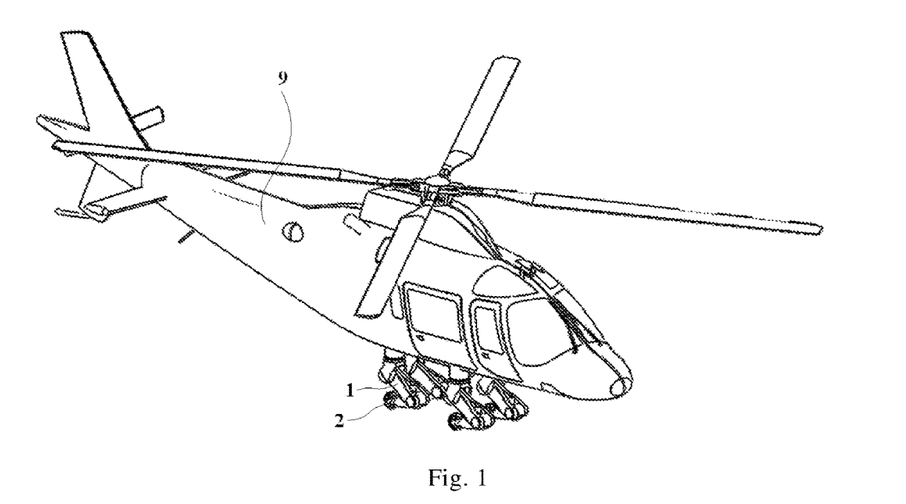
FIG. 1 is a schematic view showing a structure of an aircraft according to an embodiment of the present invention.
Figure 6:
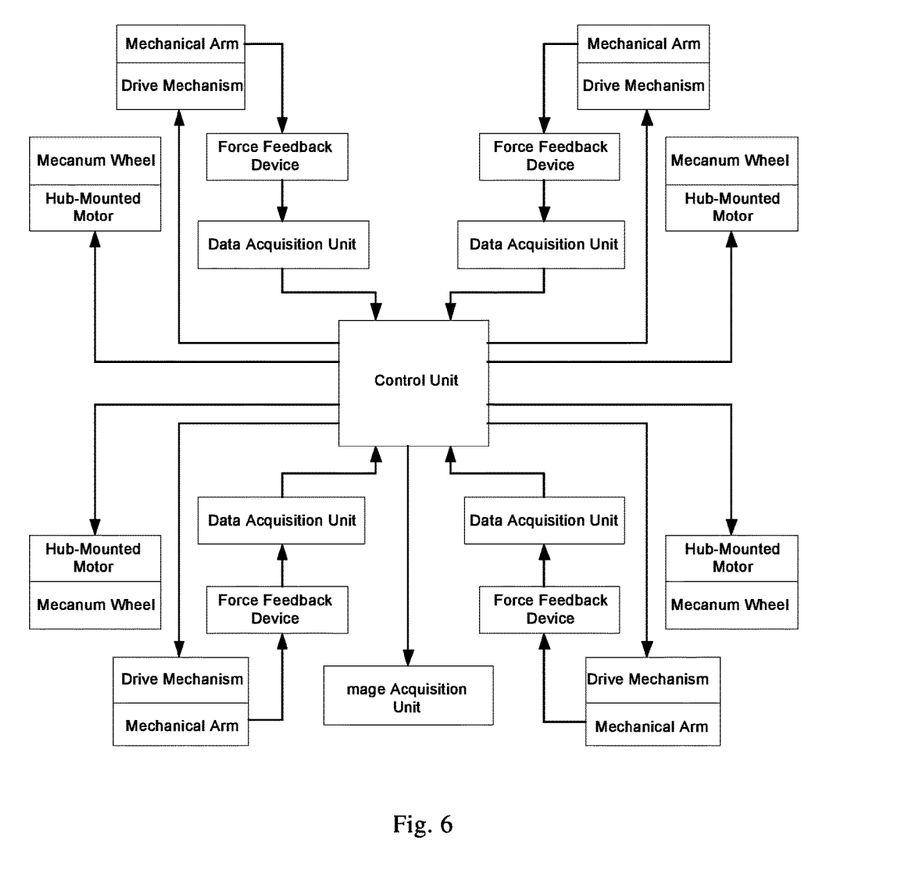
FIG. 6 is a block diagram of components of an undercarriage according to an embodiment of the present invention.

In this embodiment, as shown in FIG. 1 and FIG. 6, an undercarriage for an aircraft 9 comprises a plurality of mechanical arms 1. One end of each of the mechanical arms 1 is connected to the aircraft 9 and the other end is connected with a rotating wheel configured to come into contact with a ground surface. The undercarriage further comprises a force feedback device configured to detect whether or not the mechanical arms 1 receive forces, respectively. Data detected by the force feedback device is transmitted to a control unit through a data acquisition unit. Thereby, the control unit judges whether or not the mechanical arms 1 have come into contact with the ground surface. The drive mechanisms of the undercarriage are used to respectively drive the mechanical arms 1 to move independently.

Figure 7:
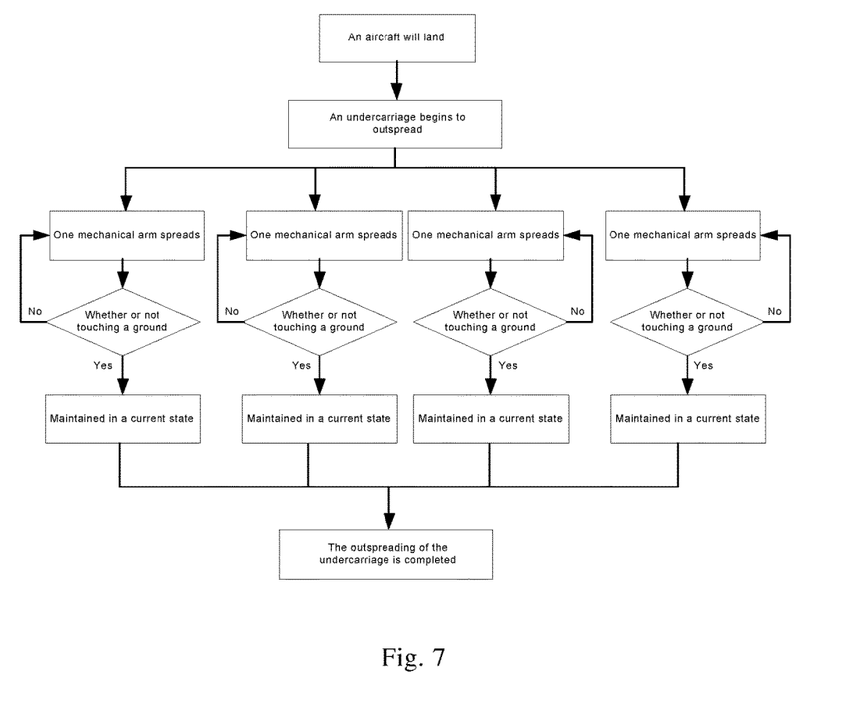
FIG. 7 is a flow diagram of an operation of the undercarriage according to an embodiment of the present invention, at the time of outspreading.

As shown in FIG. 7, when the aircraft 9 will land and the undercarriage is outspreading, the drive mechanisms drive the mechanical arms 1 to spread, respectively. Specifically, the drive mechanisms first drive the mounts 11 to rotate to required positions relative to the bottom surface of the aircraft 9, thereby ensuring that the mechanical arms 1 after outspreading face towards required directions. Then, the drive mechanisms drive the mechanism arms 1 such that angles between the mounts 11 and the first links 12 and angles between the first links 12 and the second links 13 are gradually increased. In other words, the folded mechanical arms 1 are gradually outspread. When the force feedback device detects that one of the mechanism arms 1 receives a resistance force, it is indicated that the one of the mechanism arms 1 has come into contact with a ground surface, so that the drive mechanisms drive the one of the mechanism arms 1 to stop moving and to be maintained in a current state, while the others of the mechanical arms 1 continue to spread until each mechanical arm touches the ground (or is spread to its maximal length).

Figure 2:
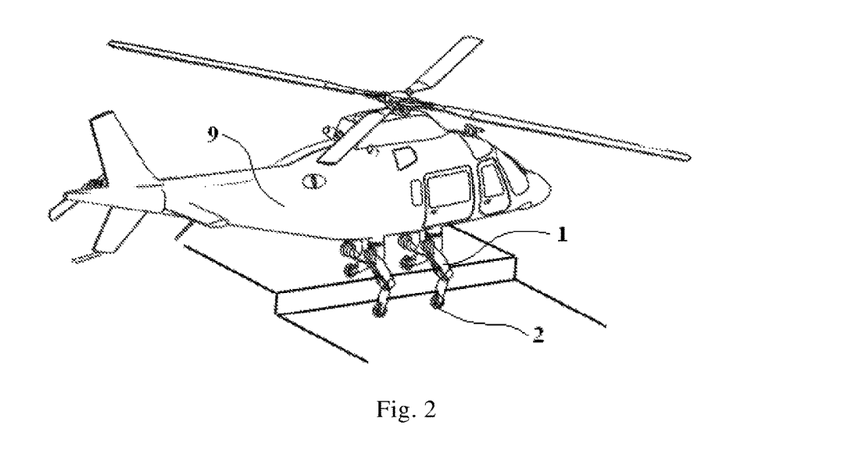
FIG. 2 is a schematic view showing a situation where the aircraft according to the embodiment of the present invention lands on an uneven ground surface.

In other words, in this embodiment, each mechanical arm 1 will stop spreading immediately after touching the ground, so that each mechanical arm 1 will be spread to just come into contact with the ground surface. Hence, as shown in FIG. 2, if a ground surface is uneven, when the undercarriage has completed outspreading, the mechanical arms 1 can spread to different lengths, respectively, and all come into contact with the ground surface, thereby ensuring that the aircraft 9 is stably supported.

Figure 3:
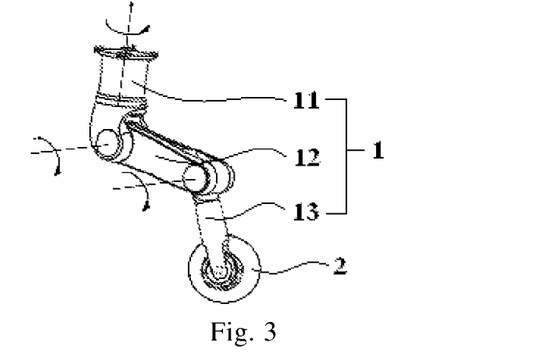
FIG. 3 is a schematic view showing a partial structure of one mechanical arm of an undercarriage according to an embodiment of the present invention.

As shown in FIG. 3, the mechanical arm 1 of the present embodiment is in the form of "three sections". Any adjacent two of the three sections are rotatable (or foldable or spreadable) relative to each other, so that the entire mechanical arm 1 is bendable or foldable. When the mechanical arm 1 is not used, it can be folded to occupy a smaller space. When it is in use, the mechanical arm 1 can gradually spread to a fairly long length. Therefore, such a folded mechanical arm 1 has a simple structure, a good stability, and a great variation range of length.

In addition, since the mount 11 of the mechanical arm 1 is rotatable relative to the bottom surface of the aircraft 9, the mechanical arm 1 actually has three degrees of freedom. Thus, when the mechanical arm 1 is extended, a spreading direction of the mechanical arm 1 can be adjusted, or a position of an actual supporting point (the rotating wheel) of the mechanical arm 1 can be adjusted. Specifically, on one hand, a suitable supporting point can be selected according to a condition of the ground surface, thereby avoiding a ground surface position (for example a soft ground surface such as slush) which is unsuitable for being contacted. On the other hand, much more stable support can also be achieved by selecting a position of an actual supporting point. For example, all of actual positions where the mechanical arms 1 come into contact with the ground surface may be positions outside a range of a fuselage, thereby greatly improving stability of support.

In some embodiments, if the undercarriage is an undercarriage for a manned aircraft, a diameter of the rotating wheel is in a range of 170-300 mm; while, if the undercarriage is an undercarriage for an unmanned aircraft, the diameter of the rotating wheel is in a range of 5-70 mm.

Apparently, a size of the rotating wheel is correlative to its pressure bearing capability and its capability of reducing an impact in landing. It is found by research that, if the undercarriage according to the embodiment is used, for a general manned aircraft, it suffices that the diameter of the rotating wheel is in a range of 170-300 mm; while for an unmanned aircraft, it suffices that the diameter of the rotating wheel is in a range of 5-70 mm since a size of the unmanned aircraft is generally small.

In some embodiments, the rotating wheel is a Mecanum wheel 2, and the undercarriage further comprises a rotating wheel driving mechanism configured to drive the Mecanum wheel 2 to rotate.

Figure 4:
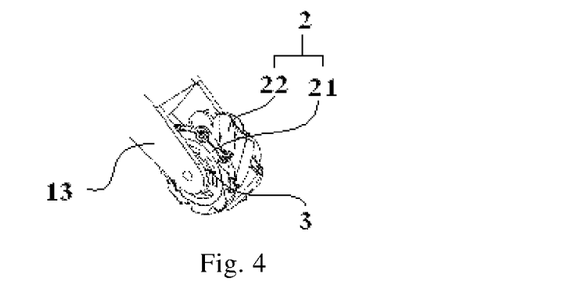
FIG. 4 is a schematic view showing a partial structure of a Mecanum wheel of an undercarriage according to an embodiment of the present invention.
Figure 5:
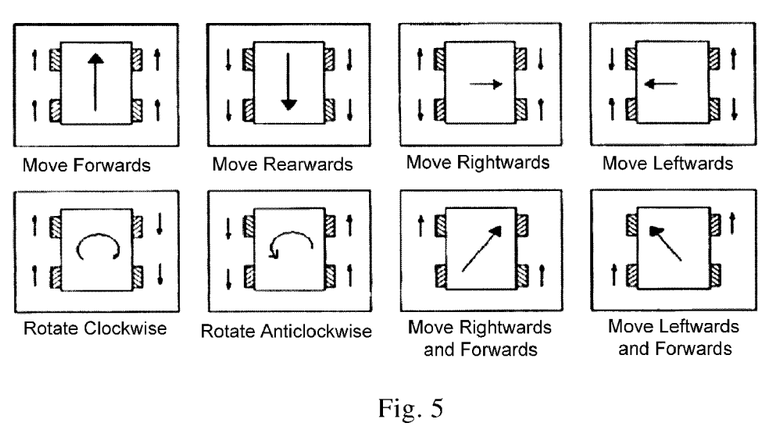
FIG. 5 is a schematic diagram showing principles about motions of the Mecanum wheel in different directions.

Some of rotating wheels of existing undercarriages are unpowered and thus the aircraft 9 still needs to move with towing operation of a towing vehicle, while a moving direction of some of the rotating wheels is limited and thus motions of the aircraft 9, such as turning, are inflexible so that a large operation space is needed. However, the above-mentioned problems are solved by the Mecanum wheel 2 with the rotating wheel driving mechanism, which is adopted in the embodiment. The Mecanum wheel 2 is also called a universal wheel. As shown in FIG. 4, on a rim of a body 21 of the Mecanum wheel, there are a plurality of rollers 22 disposed obliquely (usually inclined at an angle of 45 degrees) to an axle. These rollers 22 are independently rotatable. Thereby, as shown in FIG. 5, component motions of the body 21 and the rollers 22 of the Mecanum wheel can be combined into various resultants, by respectively rotating the body 21 and the rollers 22 in different directions at different speeds. As a result, in the case where an orientation of the aircraft 9 is not changed, a motion in any direction will be achieved (since a specific method of achieving a motion in any direction with the Mecanum wheel 2 is known, it is no longer described here in detail). Hence, with the Mecanum wheel 2, the aircraft 9 in which the undercarriage according to the embodiment is used can achieve a flexible omnidirectional motion in a small space.

In addition, in fact, the Mecanum wheel 2 contacts with a ground surface through a plurality of rollers 22. Therefore, a force received by the Mecanum wheel is shared by the plurality of rollers 22. As a result, in the case of the same entire size, the Mecanum wheel 2 has stronger capability to withstand a pressure and an impact and thus is suitable for an undercarriage of an aircraft 9 that needs to bear a heavy weight.

In some embodiments, the rotating wheel driving mechanism is a hub-mounted motor 3 disposed in a hub of the Mecanum wheel 2.

In this embodiment, as shown in FIG. 4, the hub-mounted motor 3 is a motor which is directly mounted in a hub of a driven wheel (the Mecanum wheel 2). In this way, a transmission mechanism can be omitted, thereby saving a space.

In some embodiments, the rollers 22 of the Mecanum wheel 2 are made of polyurethane.

The number of the rollers 22 of the Mecanum wheel 2 is large and the rollers 22 are small. Therefore, generally the rollers 22 cannot be in the form of air-filled ones. As a result, a material having both high strength and good toughness and impact resistance may be selected for making the roller 22, to further improve its impact resistance and compression resistance. It is found by research that polyurethane material is particularly suitable for making the rollers 22. Of course, it is also feasible to make the rollers 22 using other high-strength materials.

In some embodiments, the number of the mechanical arms 1 is three, and connection points where the three mechanical arms 1 are connected with the aircraft 9 are three vertexes of an equilateral triangle.

Apparently, in order to provide stable support, at least three mechanical arms 1 are needed. When the connection points between the mechanical arms 1 and the aircraft 9 may be arranged to form the equilateral triangle, every position of the aircraft 9 can be stably supported.

Of course, as described above, although the connection points between the mechanical arms 1 and the aircraft 9 form the equilateral triangle, final contact points (rotating wheels) between the mechanical arms 1 and the ground surface do not necessarily form a equilateral triangle since the mounts 11 are rotatable about the axes perpendicular to the bottom surface of the aircraft 9 and thus the mechanical arms 1 can rotate into different directions.

As another form of the embodiment, the number of the mechanical arms 1 may be four and connection points where the four mechanical arms 1 are connected with the aircraft 9 are four vertexes of a rectangle or an isosceles trapezoid.

Apparently, theoretically, three mechanical arms 1 forming a triangle can provide a stable support. However, if the undercarriage occupies a limited area, more mechanical arms 1 are probably needed to provide a sufficiently stable support. As shown in FIG. 1 and FIG. 2, it is found by research that four mechanical arms 1 forming a quadrangle (such as a rectangle or an isosceles trapezoid) are usually enough to provide a stable support.

In some embodiments, a proportion of lengths of the mount 11, the first link 12, and the second link 13 is 0.8-1.2:2.6-3.4:1.7-2.3, and for example 1:3:2.

Apparently, a proportion of lengths of "sections" of the mechanical arm 1 affects a motion manner, a force distribution, and the like of the mechanical arm 1. As found by research, it is not necessary for a length of the mount 11 to be too large, since the mount 11 is mainly used for connecting to the aircraft 9 and achieving a degree of freedom of a rotation relative to the bottom surface of the aircraft 9, and the first link 12 and the second link 13 for achieving "a foldable function (or a length control function)" should be longer. In an example, the first link 12 of the two links is longer since the first link 12 can drive the second link 13 to move together. More specifically, the proportion of lengths of the mount 11, the first link 12, and the second link 13 may be 1:3:2 or may approach 1:3:2. In this way, it can be ensured that when the mechanical arm is folded, a "completely folded" effect is achieved since a total length of the mount 11 and the second link 13 is substantially equal to the length of the first link 12.

Generally, a manned aircraft has a larger size, and accordingly the mechanical arm 1 of the undercarriage of the manned aircraft also has a larger length. Therefore, with regard to the undercarriage for the manned aircraft, a total length of the mount 11, the first link 12, and the second link 13 may be in a range of 1.5-2 m. Generally, an unmanned aircraft has a smaller size, and accordingly the mechanical arm 1 of the undercarriage of the unmanned aircraft also has a smaller length. Therefore, with regard to the undercarriage for the unmanned aircraft, the total length of the mount 11, the first link 12, and the second link 13 may be in a range of 0.12-0.3 m.

In some embodiments, the mount 11 is rotatable 360 degrees about the axis perpendicular to the bottom surface of the aircraft 9; an angle between the mount 11 and the first link 12 is variable in a range of 0-180 degrees; and an angle between the first link 12 and the second link 13 is variable in a range of 0-180 degrees.

In other words, in some embodiments, the mount 11 is omnidirectionally freely rotatable 360 degrees so that the mechanical arm 1 can face towards any direction. In some embodiments, the mount 11 and the first link 12 are rotatable relative to each other in a range from an angle (0 degree) at which they are completely folded to an angle (180 degrees) at which they are completely outspread, and the first link 12 and the second link 13 are rotatable relative to each other in a range from an angle (0 degree) at which they are completely folded to an angle (180 degrees) at which they are completely outspread, so that the mechanical arm 1 achieves a length variation in a maximal range.

In some embodiments, the drive mechanisms configured to drive the mounts 11 and the first links 12 to rotate relative to one another, and configured to drive the first links 12 and the second links 13 to rotate relative to one another are hydraulic drive mechanisms; while the drive mechanisms configured to drive the mounts 11 to rotate about the axes perpendicular to the bottom surface of the aircraft 9 are electric drive mechanisms.

In other words, relative rotations among the mount 11, the first link 12, and the second link 13 are achieved by a hydraulic drive, while a rotation of the mount 11 relative to the aircraft 9 is achieved by an electric drive. This is because the hydraulic drive can provide a larger driving force but a slower relative speed, while the electric drive is opposite to that. When the aircraft 9 is supported, particular relative angles among the mount 11, the first link 12, and the second link 13 must be maintained while the mount 11, the first link 12, and the second link 13 need to overcome a fairly large gravity of the aircraft 9. Hence, joints among them receive larger forces. As a result, the hydraulic drive may be used. Comparatively speaking, the mount 11 does not receive a large force. It suffices that the mount 11 can rotate to a required position relative to the aircraft 9 quickly. Hence, the electric drive may be used.

In some embodiments, the undercarriage further comprises an image acquisition unit disposed at the bottom surface of the aircraft 9. In the outspreading process of the undercarriage, the image acquisition unit acquires an image under the aircraft 9, so that the drive mechanisms drive the mounts 11 to rotate about the axes perpendicular to the bottom surface of the aircraft 9 according to the image.

As described above, the mechanical arm 1 can be supported at different positions on the ground surface by rotating the mount 11. To this end, an image acquisition unit (such as a camera or a pick-up head) may be disposed at a bottom of the aircraft 9 to acquire an image of a ground surface under the aircraft 9. By analyzing the image, it is determined which positions of a ground surface for landing are suitable for being contacted by the mechanical arm 1 and which positions of the ground surface are unsuitable for being contacted by the mechanical arm 1 (for example, the positions are a soft ground surface such as slush). Then, according to the analyzed results, the mechanical arms 1 are driven to rotate so that they "avoid" an unsuitable ground surface, thereby ensuring that the mechanical arms 1 are all supported on a relatively even and firm ground surface, thereby providing a more stable support.

In some embodiments, when the undercarriage is in an outspread state, if the force feedback device detects that any one of the mechanism arms 1 receives no force, the drive mechanisms drives the one of the mechanism arms 1 to continue to spread gradually until the force feedback device detects that the one of the mechanism arms 1 receives a force, and then the drive mechanisms drive the one of the mechanism arms 1 to be maintained in a current state.

When the undercarriage has completed an extension and is in an outspread state (in this case the aircraft 9 necessarily lands on the ground surface), the aircraft 9 still probably performs a motion such as taxiing. Therefore, a condition of the ground surface with which the undercarriage comes into contact is probably changed, some mechanical arms 1 which have already touched the ground will probably move to recesses of the ground surface so as not to touch the ground, thereby also no longer receiving forces, which will render the support unstable. In this case, if it is found that one of the mechanical arm 1 receives no force, the drive mechanisms may drive it to continue to extend until it touches the ground and receives a force again, thereby providing a stable support during movement.

Therefore, the above undercarriage is suitable for a vertical landing aircraft and particularly for a helicopter or a propeller-driven unmanned aircraft. This is because adjustment of the undercarriage needs certain time. When the aircraft 9 taxis after landing, its speed is often high and a condition of a ground surface under the undercarriage varies quickly. An adjustment speed of the undercarriage cannot keep up with the variation of the condition of the ground surface. However, the vertical landing aircraft moves only in a vertical direction when landing. Therefore, a condition of a ground surface under the undercarriage will not vary. A stable support can be achieved as long as the mechanical arms 1 gradually outspread and touch a ground, respectively.

In accordance with another aspect of the present invention, there is provided an aircraft comprising the above-mentioned undercarriage.

The undercarriage is connected to a bottom surface of the aircraft 9.

In some embodiments, the aircraft 9 is a vertical landing aircraft. For example, the vertical landing aircraft is a helicopter or a propeller-driven unmanned aircraft.

As described in the foregoing, the undercarriage of the present invention is most suitable for a vertical landing aircraft, but is not limited to the vertical landing aircraft.

In some embodiments, the aircraft 9 further comprises: a turnover plate having a connection surface, the turnover plate is capable of turning over in a range of a position where the connection surface faces towards a ground surface and a position where the connection surface faces away from the ground surface, and the mounts 11 of the mechanical arms 1 are connected to the connection surface of the turnover plate.

In other words, a turnover plate capable of turning over is disposed in a fuselage of the aircraft 9, while the mechanical arms 1 are connected to a connection surface of the turnover plate. Thereby, when the aircraft 9 lands, the turnover plate can turn over to a position where the connection surface faces downwards, so that the mechanical arms 1 (or the mounts 11) face downwards for supporting. When the aircraft 9 flies, the turnover plate can turn over to a position where the connection surface faces towards an inside of a belly of the aircraft, to drive the mechanical arms 1 to turn over. Thereby the mechanical arms 1 are accommodated in the belly of the aircraft so that the aircraft 9 has a better aerodynamic profile, a better stealth performance, and the like.

In accordance with a further aspect of the present invention, there is provided a landing method for the above-mentioned aircraft.

Figure 8:
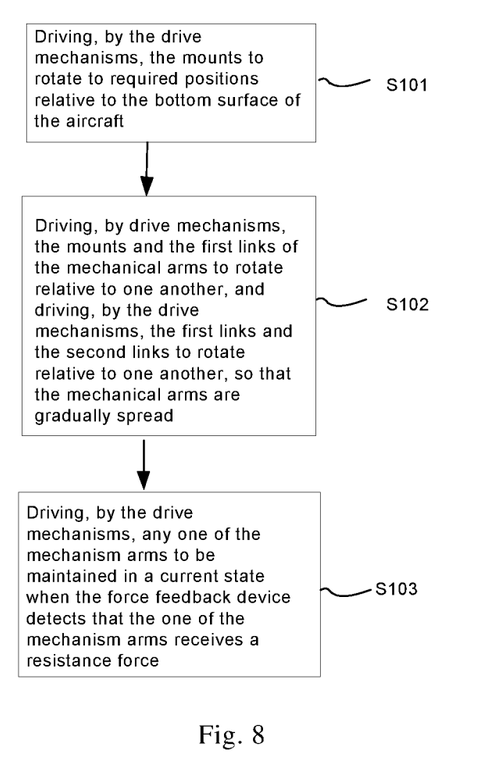
FIG. 8 is a flow diagram of an aircraft landing method according to an embodiment of the present invention.

As shown in FIG. 7 and FIG. 8, the aircraft landing method comprises:

a step S101 of driving, by the drive mechanisms, the mounts 11 to rotate to required positions relative to the bottom surface of the aircraft 9;

a step S102 of driving, by the drive mechanisms, the mounts 11 and the first links 12 of the mechanical arms 1 to rotate relative to one another, and driving, by the drive mechanisms, the first links 12 and the second links 13 to rotate relative to one another, so that the mechanical arms 1 are gradually spread; and a step S103 of driving, by the drive mechanisms, any one of the mechanism arms 1 to be maintained in a current state when the force feedback device detects that the one of the mechanism arms 1 receives a resistance force.

The aircraft according to the embodiments of the present invention has the abovementioned undercarriage. Therefore, when the aircraft lands, the abovementioned method may be used. Firstly, the undercarriage is turned over to face downwards (if there is the turnover plate). Then, an image of a ground surface at a landing site is acquired by means of the image acquisition unit (if there is the image acquisition unit). According to the image, it is analyzed on what positions the mechanism arms 1 should be supported and then the mounts 11 are driven to rotate to suitable positions. Next, the mounts 11 and the first links 12 begin to rotate relative to one another so that angles between the mounts 11 and the first links 12 begin to be gradually increased, and meanwhile the first links 12 and the second links 13 begin to rotate relative to one another so that angles between the first links 12 and the second links 13 begin to be gradually increased. Thereby, the mechanical arms 1 begin to outspread. When the force feedback device detects that one of the mechanism arms 1 receives a resistance force, it is indicated that the one of the mechanism arms 1 has come into contact with a ground surface, so that the drive mechanisms drive the one of the mechanism arms 1 to stop moving and to be maintained in a current state, while the others of the mechanical arms 1 continue to spread until each mechanical arm touches the ground (or spreads to its maximal length). Thereby, the outspreading of the undercarriage is completed.

In some embodiments, a speed of a relative rotation between the mount 11 and the first link 12 and a speed of a relative rotation between the first link 12 and the second link 13 are 1-5 deg/s.

In other words, in some embodiments, when the mechanical arm 1 outspreads, a rate of change of each of angles among the "sections" is within the above range, so that the mechanical arm 1 can outspread quickly while it can stop in time when touching a ground, thereby avoiding its excessively large amount of movement from affecting a supporting effect after touching the ground.

Of course, when the aircraft takes off, it suffices that the mechanical arms 1 are driven to be gradually folded (and are turned over into a belly of the aircraft) after the aircraft is out of contact with the ground (for example, all of the mechanical arms 1 receive no forces or are each at some height from the ground surface). The folding process of the undercarriage is opposite to the outspreading process of the undercarriage and thus is no longer described in detail.

The undercarriage of the present invention comprises a plurality of force feedback devices and a plurality of independently drivable mechanical arms. Therefore, when the aircraft will land and the undercarriage is outspreading, the drive mechanisms drive the mechanical arms to spread, respectively. When the force feedback device detects that one of the mechanism arms receives a force (touches the ground), the drive mechanisms cause the one of the mechanism arms to stop moving and to be maintained in a current state, while the others of the mechanical arms continue to spread until they all touch the ground, respectively. Hence, if a ground surface is uneven, the mechanical arms can spread to different lengths, respectively, and all come into contact with the ground surface, thereby stably supporting the aircraft.

The undercarriage of the present invention is suitable for various aircrafts, but may be used for a vertical landing aircraft, and for example a helicopter and a propeller-driven unmanned aircraft.

It should be appreciated that the above embodiments are only exemplary ones for explaining principles of the present invention. However, the present invention is not limited to the embodiments. Those skilled in the art may make various changes and modifications to the embodiments without departing from the spirit and principles of the present invention, and these changes and modifications also fall within the protection scope of the present invention.

What is claimed is:

1. An undercarriage for an aircraft, the undercarriage comprising:
    at least three bendable mechanical arms, wherein: each mechanical arm comprises a mount, a first link, and a second link located in a same plane, a first end of the mount is connected with the aircraft, a second end of the mount is pivotably connected with a first end of the first link, the mount is rotatable about an axis perpendicular to a horizontal bottom surface of the aircraft, a second end of the first link is pivotably connected with a first end of the second link, and a second end of the second link is connected with a rotating wheel;
    a force feedback device configured to detect whether or not the mechanical arms receive forces, respectively; and
    drive mechanisms configured to respectively drive the mechanical arms to move such that, in an outspreading process of the undercarriage, the drive mechanisms drive any one of the mechanism arms to be maintained in a current state when the force feedback device detects that the one of the mechanism arms receives a force.

2. The undercarriage of claim 1, wherein:
    the undercarriage comprises an undercarriage for a manned aircraft, and a diameter of the rotating wheel is in a range from 170 mm to 300 mm; or
    the undercarriage comprises an undercarriage for an unmanned aircraft, and the diameter of the rotating wheel is in a range from 5 mm to 70 mm.

3. The undercarriage of claim 1, wherein:
    the rotating wheel comprises a Mecanum wheel; and
    the undercarriage further comprises a rotating wheel driving mechanism configured to drive the Mecanum wheel to rotate.

4. The undercarriage of claim 3, wherein:
    the Mecanum wheel comprises a body and a plurality of rollers disposed at the body and made of polyurethane.

5. The undercarriage of claim 3, wherein:
the rotating wheel driving mechanism comprises a hub-mounted motor disposed in a hub of the Mecanum wheel.

6. The undercarriage of claim 1, wherein:
the number of the mechanical arms is three, and connection points where the three mechanical arms are connected with the aircraft are three vertexes of an equilateral triangle.

7. The undercarriage of claim 1, wherein:
the number of the mechanical arms is four, and connection points where the four mechanical arms are connected with the aircraft are four vertexes of a rectangle or an isosceles trapezoid.

8. The undercarriage of claim 1, wherein:
a proportion of lengths of the mount, the first link, and the second link is 0.8-1.2:2.6-3.4:1.7-2.3.

9. The undercarriage of claim 8, wherein:
the proportion of the lengths of the mount, the first link, and the second link is 1:3:2.

10. The undercarriage of claim 1, wherein:
the undercarriage comprises an undercarriage for a manned aircraft, and a total length of the mount, the first link, and the second link is in a range from 1.5 m to 2 m; or
the undercarriage comprises an undercarriage for an unmanned aircraft, and the total length of the mount, the first link, and the second link is in a range from 0.12 m to 0.3 m.

11. The undercarriage of claim 1, wherein:
the mount is rotatable 360 degrees about the axis perpendicular to the bottom surface of the aircraft;
an angle between the mount and the first link is variable in a range from 0 degree to 180 degrees; and
an angle between the first link and the second link is variable in a range from 0 degree to 180 degrees.

12. The undercarriage of claim 1, wherein:
the drive mechanisms configured to drive the mounts and the first links to rotate relative to one another and configured to drive the first links and the second links to rotate relative to one another comprise hydraulic drive mechanisms; and
the drive mechanisms configured to drive the mounts to rotate about the axes perpendicular to the bottom surface of the aircraft comprise electric drive mechanisms.

13. The undercarriage of claim 1, further comprising:
an image acquisition unit disposed at the bottom surface of the aircraft, wherein:
in the outspreading process of the undercarriage, the image acquisition unit acquires an image under the aircraft, so that the drive mechanisms drive the mounts to rotate about the axes perpendicular to the bottom surface of the aircraft according to the image.

14. The undercarriage of claim 1, wherein:
when the undercarriage is in an outspread state, if the force feedback device detects that any one of the mechanism arms receives no force, the drive mechanisms drive the one of the mechanism arms to continue to spread until the force feedback device detects that the one of the mechanism arms receives a force, and then drive the one of the mechanism arms to be maintained in a current state.

15. An aircraft comprising:
the undercarriage according to claim 1.

16. The aircraft of claim 15, wherein:
the aircraft comprises a vertical landing aircraft.

17. The aircraft of claim 16, wherein:
the vertical landing aircraft comprises a helicopter or a propeller-driven unmanned aircraft.

18. The aircraft of claim 15, further comprising:
a turnover plate having a connection surface, the turnover plate is capable of turning over in a range between a position where the connection surface faces towards a ground surface and a position where the connection surface faces away from the ground surface, and the mounts of the mechanical arms are connected to the connection surface of the turnover plate.

19. A landing method for an aircraft having an undercarriage that comprises:
at least three bendable mechanical arms, wherein: each mechanical arm comprises a mount, a first link, and a second link located in a same plane, a first end of the mount is connected with the aircraft, a second end of the mount is pivotably connected with a first end of the first link, the mount is rotatable about an axis perpendicular to a horizontal bottom surface of the aircraft, a second end of the first link is pivotably connected with a first end of the second link, and a second end of the second link is connected with a rotating wheel;
a force feedback device configured to detect whether or not the mechanical arms receive forces, respectively; and
drive mechanisms configured to respectively drive the mechanical arms to move such that, in an outspreading process of the undercarriage, the drive mechanisms drive any one of the mechanism arms to be maintained in a current state when the force feedback device detects that the one of the mechanism arms receives a force,
the landing method comprising:
driving, by the drive mechanisms, the mounts to rotate to required positions relative to the bottom surface of the aircraft;
driving, by the drive mechanisms, the mounts and the first links of the mechanical arms to rotate relative to one another, and driving, by the drive mechanisms, the first links and the second links to rotate relative to one another, so that the mechanical arms are gradually spread; and
driving, by the drive mechanisms, any one of the mechanism arms to be maintained in a current state when the force feedback device detects that the one of the mechanism arms receives a resistance force.

20. The landing method of claim 19, wherein:
a speed of a relative rotation between the mount and the first link and a speed of a relative rotation between the first link and the second link are in a range from 1 deg/s to 5 deg/s.

* * * * *